No. 806,456. PATENTED DEC. 5, 1905.
H. F. BICKEL.
ENGINEER'S BRAKE VALVE.
APPLICATION FILED APR. 10, 1905.
2 SHEETS—SHEET 2.
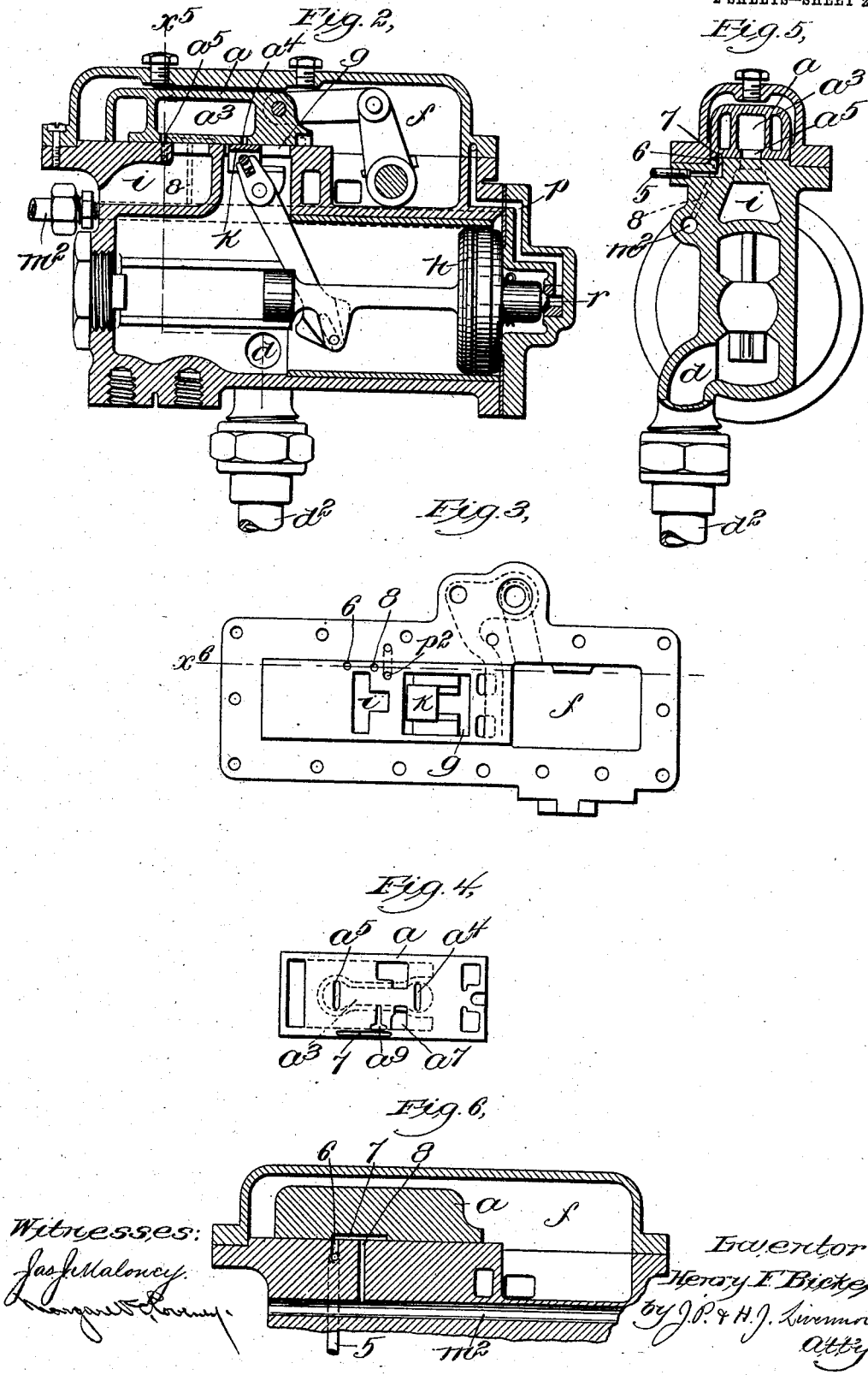

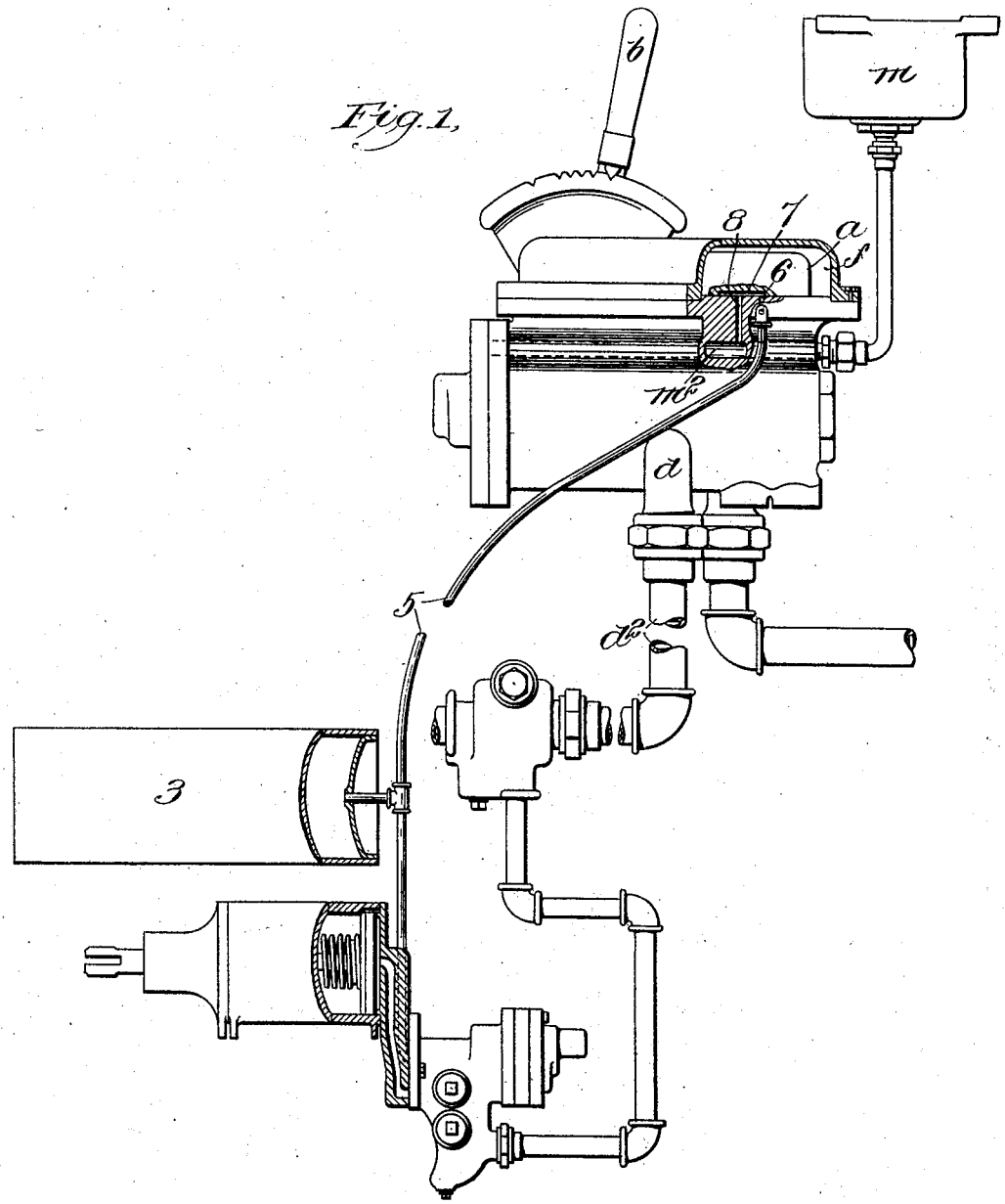

UNITED STATES PATENT OFFICE.

HENRY F. BICKEL, OF PLAINFIELD, NEW JERSEY, ASSIGNOR TO NEW YORK AIR BRAKE COMPANY, A CORPORATION OF NEW JERSEY.

ENGINEER'S BRAKE-VALVE.

No. 806,456.       Specification of Letters Patent.       Patented Dec. 5, 1905.

Application filed April 10, 1905. Serial No. 254,788.

*To all whom it may concern:*

Be it known that I, HENRY F. BICKEL, a citizen of the United States, residing in Plainfield, county of Union, and State of New Jersey, have invented an Improvement in Engineers' Brake-Valves, of which the following description, in connection with the accompanying drawings, is a specification, like characters on the drawings representing like parts.

This invention relates to the appliances operated by or under the control of the engineer for controlling the brakes of an automatic air-brake system.

The invention is shown as employed in connection with an engineer's brake-valve of the character of that shown in Letters Patent to Robert C. Augur and Henry C. Bickel, No. 725,020, dated April 14, 1903, to which reference may be had. The type of engineers' valve shown in said patent to which the present invention is applicable is characterized by a cut-off valve for closing the escape-passage through which the train-pipe air is permitted to escape in the operation of applying the brakes, which cut-off valve is operated by a piston subjected to train-pipe pressure upon one side and upon the other side to the pressure of a determinate quantity of air in a small chamber provided therefor which normally is under pressure equal to that of the train-pipe and which when the train-pipe pressure is reduced moves the piston and causes the cut-off valve to be operated to close the train-pipe escape-passage when the train-pipe pressure has been reduced the desired amount. In the construction shown in said patent to Augur and Bickel the said small chamber is charged with air from the train-pipe in the operation produced under control of the engineer's valve known as the operation of "releasing" the brakes, and also when the engineer's valve is in what is known as "running" position there is a communication from the train-pipe to the small chamber whereby the latter is always kept charged to substantial equality with train-pipe pressure. The application of the brakes in the automatic system is dependent upon reduction in train-pipe pressure, and the amount of braking force attained depends upon the reduction of pressure in the train-pipe as compared with the pressure in the auxiliary reservoirs at the beginning of the train-pipe reduction. When the system is in normal condition with the brakes released, the auxiliary reservoirs are charged with the same pressure as the train-pipe; but in the operation of releasing the brakes and for a short time after the recharging operation has begun while the engineer's valve is at release or running position the train-pipe pressure may be considerably higher than that in the auxiliary reservoirs, as some time is required for the charging of the said reservoirs up to train-pipe pressure. If under such conditions—that is, when the train-pipe pressure is substantially higher than that in the auxiliary reservoirs—it is desired to apply the brakes, the reduction in train-pipe pressure made by the engineer may not produce the desired application of the brakes, since the reduction in train-pipe pressure, although sufficient if the reduction in the auxiliary reservoirs was equal to the train-pipe pressure at the outset, might not be sufficient with the pressure in the auxiliary reservoirs lower than the train-pipe pressure. In other words, with an engineer's valve of the construction shown in the Augur and Bickel patent the cut-off valve which operates to stop the escape of air from the train-pipe is operated in accordance with the train-pipe pressure which was in the system at the time when the application of the brakes was made, whereas the reduction of train-pipe pressure should be relative to the pressure in the auxiliary reservoirs rather than that in the train-pipe in order to obtain the desired amount of braking force.

The present invention consists, mainly, in appliances whereby the small chamber containing the air for operating the cut-off valve which stops the escape of air from the train-pipe in making an application of the brakes is charged to the pressure of the auxiliary reservoirs instead of to the pressure of the train-pipe in case the said pressures have not yet acquired the normal condition of equilibrium. The result of this construction is that when the engineer's valve is opened by the engineer to apply the brakes the cut-off valve is operated to stop the escape of air from the train-pipe when the train-pipe pressure has fallen the desired amount below the pressure that was in the auxiliary reservoirs at the time when the engineer's valve was operated, and consequently gives the desired application of the brakes, which might not have been obtained if the closure of the cut-off valve had depended upon the pressure in the train-pipe at the beginning of the application and would not have been obtained under these conditions if the train-pipe pressure was substantially higher than the auxiliary-reservoir pressure at the time when the application of the brakes was made.

Figure 1 is a side elevation of an engineer's brake-valve and of a sufficient portion of an automatic air-brake system to illustrate this invention. Fig. 2 is a longitudinal section of the engineer's brake-valve. Fig. 3 is a plan view of the seat of the main valve of the engineer's valve; Fig. 4, an underneath plan of the valve proper of the engineer's brake-valve, showing the seating-face thereof; Fig. 5, a transverse section on plane $x^5$ of Fig. 2; and Fig. 6, a sectional detail at the position of the plane marked $x^6$, Fig. 3.

The main portion of the engineer's valve is shown as of the same construction as that forming the subject of patent to Augur and Bickel, No. 725,020, to which reference may be had for a full understanding of the construction and mode of operation of the valve, if desired.

For an understanding of the present case it is sufficient to point out that the various operations of admitting air to the train-pipe and exhausting it therefrom for the purpose of controlling the brakes are produced by the main hand-operated slide-valve $a$, which works in a chamber $f$, supplied with compressed air from the main reservoir on the locomotive, said valve working on a seat over an opening $g$, communicating with a chamber below the valve which is connected directly by passage $d$ with the train-pipe $d^2$ of an automatic air-brake system such as commonly used on steam-railroads in the United States. The movement of the slide-valve $a$ by the engineer for applying the brakes establishes communication from the train-pipe through said opening $g$ and passage $a^4$ in the face of the valve and passage $a^3$ in the body of the valve to another passage $a^5$ in the face of the valve, which is by the same movement placed in communication with the exhaust-passage $i$, leading to the atmosphere, the result being that when the valve $a$ is moved by the handle $b$, Fig. 1, a certain distance toward the right from the position shown in Fig. 2 air is permitted to escape from the train-pipe through the opening $g$ in the valve-seat and the passages $a^4$ $a^3$ $a^5$ in the valve and the exhaust-passage $i$ to the atmosphere. The escape of air from the train-pipe which is thus brought about by the movement of the slide-valve $a$ is automatically stopped after the desired reduction in train-pipe pressure, the said stopping of the escape of air being effected by the cut-off valve $k$, working on the seating-face of the valve and closing the opening $a^4$, said cut-off valve being operated by a piston $h$, subjected on one side to train-pipe pressure and on the other side to the pressure of a confined body of air in the small chamber $m$, Fig. 1. As shown in the Augur and Bickel patent, the said small chamber $m$ is charged from the train-pipe chamber below the valve-seat through an opening in the said piston $h$, controlled by a check-valve, and thence through a passage $m^2$, leading from the right-hand side of the piston $h$, as shown in Fig. 2, to the said small chamber $m$, which by reason of its small capacity is almost instantly charged up to train-pipe pressure when the train-pipe itself is charged from the main reservoir in the operation of releasing the brakes.

For a short period of time after the release operation and whether the engineer's valve is in what is known as "release" position or in "running" position the train-pipe pressure is likely to be considerably higher than the pressure in the auxiliary reservoirs 3 of the system, and consequently with the construction just described the pressure in the small chamber $m$ would also be considerably higher than that in the auxiliary reservoirs, and if the brakes were again applied with the system in this condition the pressure in the small chamber $m$, acting upon the piston $h$, would close the train-pipe escape-passage $a^4$ by the cut-off valve $k$ before the desired reduction in train-pipe pressure relative to auxiliary-reservoir pressure had been produced. To eliminate the possibility of such premature closing of the passage $a^4$ by the cut-off valve $k$, provision is made in accordance with the present invention for establishing communication between the small chamber $m$ and one of the auxiliary reservoirs 3 of the system—for example, that on the locomotive or tender—while the engineer's valve is at running or release position and for cutting off the said communication when the engineer's valve is in any of the positions occupied in making an application of the brakes, so that under such circumstances the air confined in the small chamber $m$ originally at auxiliary-reservoir pressure operates by its expansion to move the cut-off valve $k$, as heretofore, except that the air-pressure confined in the chamber $m$ for this work is at auxiliary-reservoir pressure instead of train-pipe pressure whenever the two pressures happen to be materially different from one another. This connection of the small chamber $m$ with an auxiliary reservoir is provided for by a duct or passage 5, connecting the auxiliary reservoir 3 with a port 6 in the seat of the main hand-operated valve $a$ of the engineer's valve, which is provided with a longitudinal groove or cavity 7, (see Figs. 4 and 6,) covering the said port 6 and affording a communication therefrom to another port 8 in the valve-seat leading to the passage $m^2$, connected to the small chamber $m$.

The groove 7 is of such size and position that it covers and connects the ports 6 and 8 in the valve-seat when the main valve $a$ is in either running or release position or in any position except those occupied in making an application of the brakes; but when the said valve is moved to any of the positions required for making an application of the brakes the port 6 is covered by the ungrooved portion of the face of the valve, thus cutting off the connection with the auxiliary reservoir and leaving only the definite volume of air in the small chamber $m$ under auxiliary-reservoir pressure to operate by its expansion to move the piston $h$, as the train-pipe pressure falls until the movement is sufficient to cause the cut-off valve $k$ to close the passage $a^4$ when the train-pipe pressure has fallen below the auxiliary-reservoir pressure an amount determined by the position to which the engineer moved the valve $a$ in order to cause the brakes to be applied. It will be seen that by thus providing for the charging of the small chamber $m$ from the auxiliary reservoir the check-valve-controlled passage from the train-pipe for charging the said small chamber employed in the apparatus of the Augur and Bickel patent may be dispensed with, as herein shown; but if it should be retained the communication thus afforded from the train-pipe would not cause the small chamber $m$ to be charged to train-pipe pressure in advance of the auxiliary reservoir by reason of the far greater capacity of the said auxiliary reservoir than of the small chamber $m$, which will, by reason of the free communication through passages 5, 6, 7, 8, and $m^2$ with the auxiliary reservoir, have its pressure equalized with that in the auxiliary reservoir so long as the train-pipe pressure remains higher than the auxiliary-reservoir pressure, although as soon as the system is fully charged all of these pressures come to a condition of substantial equality.

The prompt return of the piston $h$ to the normal position shown in Fig. 2 when the brakes are released by placing the engineer's valve in release position may be insured by the passage $p$, then connected at $p^2$ by the port-opening $a^7$ in the main valve with the exhaust-passage $i$, the escape of air through said passage $p$ being arrested by the valve $r$, carried by the piston $h$, when the latter arrives at normal position, and the retention of the piston $h$ in normal position while the engineer's valve is at running position may be insured by the connection of said passage $p$ with the exhaust by the cavity $a^9$ in the main valve under control of said valve $r$, these parts being herein shown as the same as in the valve of the Augur and Bickel patent.

I claim—

1. The combination with an engineer's valve of an automatic air-brake system having a cut-off valve for stopping escape of air from the train-pipe operated by a body of air confined in a small chamber, of means for establishing communication between said small chamber and an auxiliary reservoir of the system when the brakes are released, and for cutting off said communication between the small chamber and auxiliary reservoir when an application of the brakes is being made, substantially as and for the purpose described.

2. The combination with an engineer's valve of an automatic air-brake system having a main hand-operated valve and a cut-off valve for stopping the escape of air from the train-pipe operated by a body of air confined in a small chamber, of ports in the seat of the main hand-operated valve communicating respectively with said small chamber and with an auxiliary reservoir of the system, said ports being controlled by the main hand-operated valve, substantially as and for the purpose described.

In testimony whereof I have signed my name to this specification in the presence of two subscribing witnesses.

HENRY F. BICKEL.

Witnesses:
R. P. CONRAD,
E. McGARRAH.